US012807086B2

(12) United States Patent
Sebestyen et al.

(10) Patent No.: US 12,807,086 B2
(45) Date of Patent: Nov. 24, 2026

(54) DYNAMIC VEHICLE CONTROLS SIGNAL PROCESSING BASED ON MEDIA

(71) Applicant: Atieva, Inc., Newark, CA (US)

(72) Inventors: Colin Sebestyen, Newark, CA (US); Daniel Leung, Newark, CA (US); Dave Flynt, Newark, CA (US); Nitendra Gurung, Newark, CA (US); Perry Chan, Newark, CA (US); Chunkwok Lee, Newark, CA (US); William A. Rainey, Newark, CA (US)

(73) Assignee: Atieva, Inc., Newark, CA (US)

( * ) Notice: Subject to any disclaimer, the term of this patent is extended or adjusted under 35 U.S.C. 154(b) by 0 days.

(21) Appl. No.: 18/791,129

(22) Filed: Jul. 31, 2024

(65) Prior Publication Data

US 2026/0034952 A1 Feb. 5, 2026

Related U.S. Application Data

(60) Provisional application No. 63/596,932, filed on Nov. 7, 2023.

(51) Int. Cl.
*B60R 16/037* (2006.01)

(52) U.S. Cl.
CPC .................................. *B60R 16/037* (2013.01)

(58) Field of Classification Search
CPC . B60R 16/037; B60W 50/0098; B60W 10/30; B60H 1/00964
See application file for complete search history.

(56) References Cited

U.S. PATENT DOCUMENTS

2003/0160104 A1 8/2003 Kelly et al.
2010/0127847 A1* 5/2010 Evans ................ G06F 3/04886 345/173
2015/0053066 A1* 2/2015 Hampiholi ............ B60K 35/10 84/602

(Continued)

OTHER PUBLICATIONS

International Search Report and Written Opinion received for PCT Patent Application No. PCT/US2024/054577, mailed on Jan. 21, 2025, 9 pages.

(Continued)

*Primary Examiner* — Abby Lin
*Assistant Examiner* — Danielle M Jackson
(74) *Attorney, Agent, or Firm* — Womble Bond Dickinson (US) LLP

(57) ABSTRACT

This disclosure provides systems, devices, apparatus, and methods, including computer programs encoded on storage media, for controlling synchronized operations of automobile systems, such as automobile systems of electric vehicles. The method includes receiving a first indication to initiate, based on a set of coded instructions, a synchronized routine performed by the automobile systems, the synchronized routine including a manipulation of the automobile systems to a target setting indicated by the set of coded instructions; receiving a second indication associated with a user-based adjustment to the automobile systems, the user-based adjustment being in conflict with the target setting; and controlling an operation of the automobile systems based on prioritizing the user-based adjustment to the automobile systems over the target setting indicated by the set of coded instructions.

20 Claims, 7 Drawing Sheets

(56) References Cited

U.S. PATENT DOCUMENTS

| | | | | |
|---|---|---|---|---|
| 2015/0197205 | A1* | 7/2015 | Xiong | B60R 16/037 701/49 |
| 2017/0015318 | A1 | 1/2017 | Scofield et al. | |
| 2017/0158023 | A1* | 6/2017 | Stevanovic | B60H 1/00971 |
| 2018/0001734 | A1* | 1/2018 | Faust | B60H 1/00842 |
| 2018/0061415 | A1 | 3/2018 | Penilla et al. | |
| 2018/0181365 | A1* | 6/2018 | Winton | G06F 3/04845 |

OTHER PUBLICATIONS

International Preliminary Report on Patentability received for PCT Patent Application No. PCT/US2024/054577, mailed on May 21, 2026, 8 pages.

* cited by examiner

DYNAMIC VEHICLE CONTROLS SIGNAL PROCESSING BASED ON MEDIA

CROSS-REFERENCE TO RELATED APPLICATIONS

This application claims benefit and priority to U.S. Provisional Application No. 63/596,932, filed Nov. 7, 2023, entitled "AMBIENT LIGHT AND SANCTUARY MODE SYNCHRONIZATIONS", the content of which is incorporated herein by reference in its entirety.

TECHNICAL FIELD

The present disclosure relates generally to automobiles, such as electric vehicles (EVs), and more particularly, to dynamically controlling hardware and software features of the automobile.

BACKGROUND

As society becomes increasingly fast-paced and interconnected, drivers and passengers may seek a more enjoyable experience in their vehicles while on the road and otherwise. Electric vehicles (EVs), for instance, offer a promising alternative to traditional combustion engine vehicles, and often integrate smart technology and safety features into their designs. For example, advanced infotainment systems offer a wide range of features, such as touchscreen displays, voice recognition, and smartphone integration, that allows passengers of the vehicle to access technological features and services with ease. Furthermore, the integration of smart assistants into automobile systems can assist the driver in managing various tasks with reduced driving distractions. Accordingly, there is a need for automobile manufacturers to continually research and develop technologies that can be integrated into automobiles for providing a more convenient and enjoyable experience to the occupants.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

An immersive media platform may be implemented that utilizes vehicle systems as a playback device. The immersive media platform provides a unique media experience by utilizing and synchronizing multiple vehicle controls to create a multi-sensory experience. The playback experience may be both modular and scalable to enable playback across multiple vehicles and vehicle configurations. The immersive media playback may be enabled in various vehicle gear and ignition states.

An immersive experience may be in the form of a media package that includes audio files, video files, still images, and metadata. The media package may be provided from a media service to an immersive media experience application. The metadata includes timecode, functions, and parameters that are specific and aligned to a specified media package. Each media package provides a unique immersive experience, where multiple media packages are available through the media service. Once an immersive experience is selected by the user through an experience picker, an experience player parses the contents of the media package and synchronizes the playback between the available media streams (e.g., audio, video, etc.) and a vehicle control manager. The vehicle control manager parses metadata functions and parameters and manages the signals to enable dynamic control of various vehicle hardware control systems and units synchronized with the media streams via the experience player.

In aspects of the disclosure, systems, devices, apparatus, methods, and computer-readable medium are provided. An example method includes receiving a first indication to initiate, based on a set of coded instructions, a synchronized routine performed by the automobile systems, the synchronized routine including a manipulation of the automobile systems to a target setting indicated by the set of coded instructions; receiving a second indication associated with a user-based adjustment to the automobile systems, the user-based adjustment being in conflict with the target setting; and controlling an operation of the automobile systems based on prioritizing the user-based adjustment to the automobile systems over the target setting indicated by the set of coded instructions.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
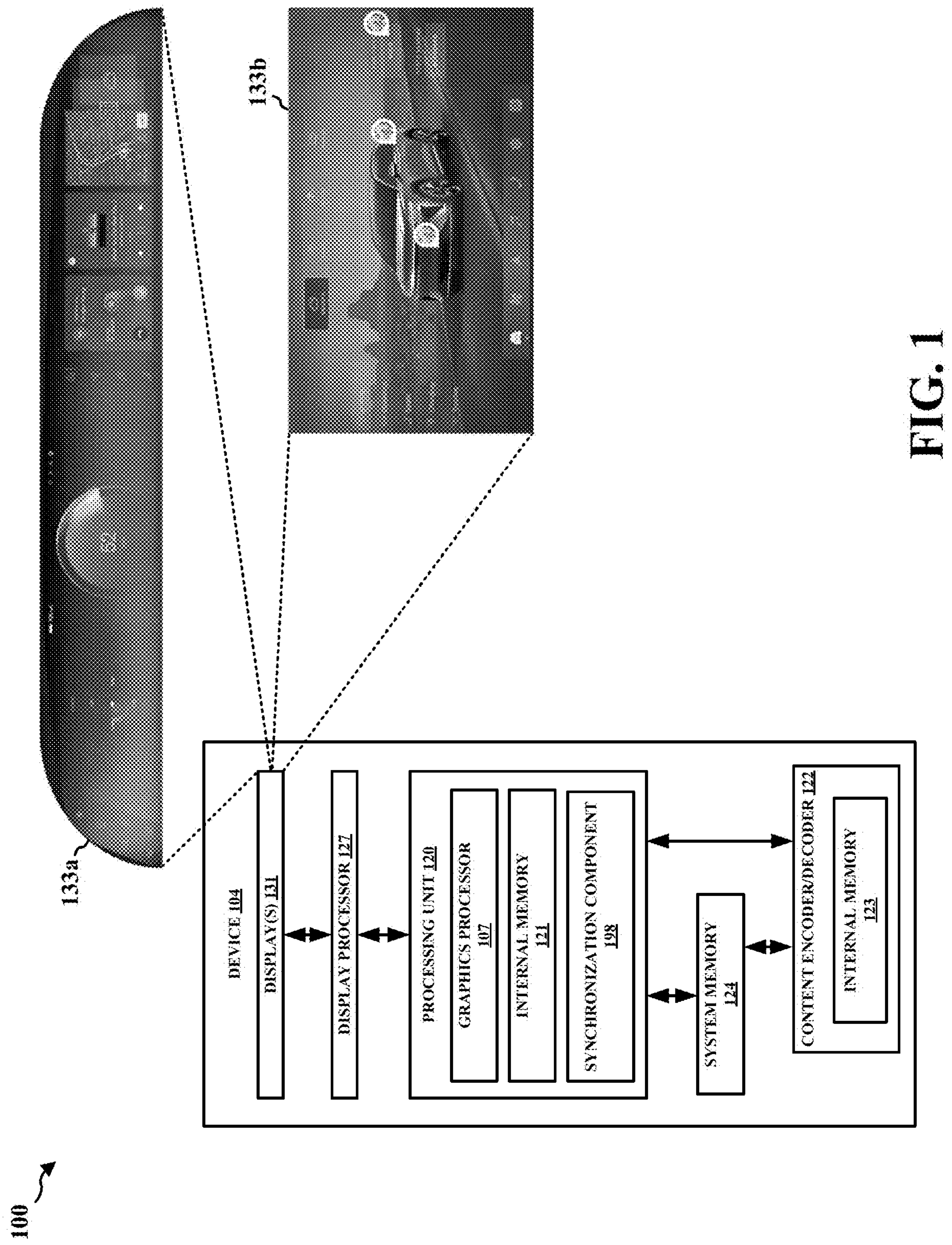
FIG. 1 is a diagram illustrating an example content generation system.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects are presented with reference to various apparatus and methods. These apparatus and methods are described in the following detailed description and illustrated in the accompanying drawings by various blocks, components, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip, baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

FIG. 1 is a block diagram that illustrates an example content generation system 100. The content generation system 100 includes a device 104 that has one or more components or circuits for performing various functions described herein. The device 104 may include one or more displays 131, a display processor 127, a processing unit 120, a system memory 124, a content encoder/decoder 122, etc. In some examples, the device 104 is an automobile, such as an electric vehicle (EV). Multiple displays 131 associated with the device 104 may be configured to display different instances of a same software application on different displays 131 at a same time. In some examples, graphics processing results/graphical content associated with an output of the software application may be displayed through user interface(s) (UI) 133*a*-133*b* on the display(s) 131. For example, a first UI 133*a* may be associated with a cockpit panel/display and a second UI 133*b* may be associated with a central information display unit (CIDU). In other examples, the graphical processing results/graphical content may be transferred to another device for display.

The processing unit 120 may include a graphics processor 107 and an internal memory 121. The processing unit 120 may be configured to perform graphics processing using the graphics processor 107 (e.g., based on a graphics processing pipeline). The processing unit 120 may also generate the graphical content displayed through the UI(s) 133*a*-133*b*. The processing unit 120 further includes a synchronization component 198, as will be discussed in further detail below, for performing various aspects and functionality described herein.

The display processor 127 may be configured to perform one or more display processing techniques on one or more frames/graphical content generated by the processing unit 120 before the frames/graphical content is displayed through the UI 133*a*-133*b* on the one or more displays 131. While the example content generation system 100 illustrates a display processor 127, it should be understood that the display processor 127 is one example of a processor that can perform the functions descried herein and that other types of processors, controllers, etc., may be used as a substitute for the display processor 127. The one or more displays 131 may be configured to display or otherwise present graphical content processed/output by the display processor 127. In some examples, the one or more displays 131 may include a liquid crystal display (LCD), a plasma display, an organic light emitting diode (OLED) display, a projection display device, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 includes the internal memory 121. The content encoder/decoder 122 may also include an internal memory 123. The processing unit 120 and the content encoder/decoder 122 may be communicatively coupled to the system memory 124 over a bus. In some examples, the processing unit 120 and the content encoder/decoder 122 may be communicatively coupled to the internal memories 121/123 over the bus or via a different connection. The content encoder/decoder 122 may be configured to receive graphical content from any source, such as the system memory 124 and/or the processing unit 120 and encode or decode the graphical content. In some examples, the graphical content may be in the form of encoded or decoded pixel data. The system memory 124 may be configured to store the graphical content in an encoded or decoded form.

The internal memories 121/123 and/or the system memory 124 may include one or more volatile or non-volatile memories or storage devices. In some examples, internal memories 121/123 or the system memory 124 may include RAM, static random access memory (SRAM), dynamic random access memory (DRAM), erasable programmable ROM (EPROM), EEPROM, flash memory, a magnetic data media, optical storage media, or any other type of memory. The internal memories 121/123 or the system memory 124 may be a non-transitory storage medium according to some examples. The term "non-transitory" may indicate that the storage medium is not embodied in a carrier wave or a propagated signal. However, the term "non-transitory" should not be interpreted to mean that the internal memories 121/123 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), or any other processing unit that may be configured to provide content for display. The content encoder/decoder 122 may be any processor configured to perform content encoding and content decoding. In some examples, the processing unit 120 and/or the content encoder/decoder 122 may be integrated into a motherboard of the device 104. The processing unit 120 may be present on a graphics card that is installed in a port of the motherboard of the device 104 or may be otherwise incorporated within a peripheral device configured to interoperate with the device 104. The processing unit 120 and/or the content encoder/decoder 122 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combination thereof. If the techniques are implemented partially in software, the processing unit 120 and/or the content encoder/decoder 122 may store instructions for the software in a suitable, non-transitory computer-readable storage medium (e.g., memory) and may execute the instructions in hardware using one or more processors to perform the techniques of this disclosure. Any of the foregoing, including hardware, software, a combination of hardware and software, etc., may be considered to be one or more processors.

In certain aspects, the processing unit 120 (e.g., CPU, GPU, etc.) may include a synchronization component 198, which may include software, hardware, or a combination thereof for controlling synchronized operations of automobile systems and configured to: receive a first indication to initiate, based on a set of coded instructions, a synchronized routine performed by the automobile systems, the synchronized routine including a manipulation of the automobile systems to a target setting indicated by the set of coded instructions; receive a second indication associated with a user-based adjustment to the automobile systems, the user-based adjustment being in conflict with the target setting; and control an operation of the automobile systems based on prioritization of the user-based adjustment to the automobile systems over the target setting indicated by the set of coded instructions. Although the following description may be focused on controlling synchronized operations of automobile systems, the concepts described herein may be applicable to other similar processing techniques.

Figure 2:
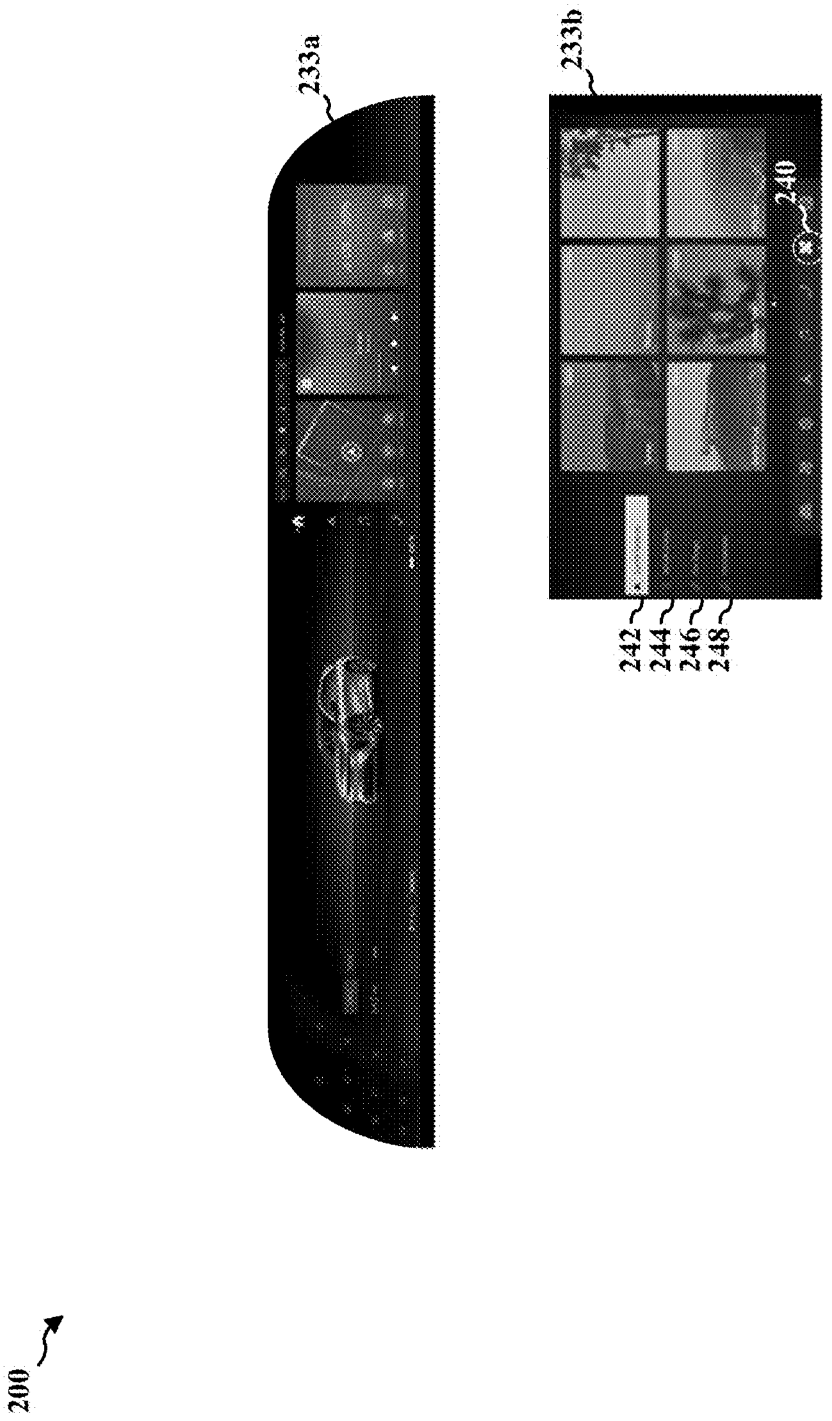
FIG. 2 is a diagram illustrating aspects for a sanctuary mode of an automobile.

FIG. 2 is a diagram 200 illustrating aspects of a sanctuary mode 240 for an automobile. The sanctuary mode 240 is a multi-sensory platform that utilizes displays(s) 233*a*-233*b* and/or mechanical systems/features of the automobile to provide a multi-dimensional user experience. For example, the sanctuary mode 240 may include content being displayed on the display(s) 233*a*-233*b* that is synchronized with various hardware components of the automobile, such as the heating, ventilating, and air conditioning (HVAC) system, haptic motors, the audio system of the automobile, lighting, scent dispensers, and the like, to provide the multi-sensory user experience.

Sanctuary mode 240 leverages the existing in-car hardware to stimulate sensory perceptions of the passengers, such as touch, sight, hearing, etc. For example, visual content presented on the displays 233*a*-233*b* may be synchronized with haptic motors installed in the automobile seats to provide vibrations or massages that align with the visual content being presented on the display(s) 233*a*-233*b*. Likewise, ambient light emitting diode (LED) lighting may be synchronized with the display(s) 233*a*-233*b* and the haptic motors. In further examples, the HVAC system is synchronized with the in-car hardware to manipulate air flows and/or temperatures within the vehicle cabin for the sanctuary mode 240.

Sanctuary mode 240 provides a curated experience that may assist passengers in obtaining peace and relaxation by using the vehicle hardware to stimulate passenger senses. Sanctuary mode 240 is generally a parked vehicular experience for the passengers. In some implementations, sanctuary mode 240 can be a driving experience. However, for safety purposes, such implementations may avoid visual stimulations on the display(s) 233*a*-233*b* when the sanctuary mode 240 is a driving experience. For example, implementing the sanctuary mode 240 mode as a driving experience may involve activating the haptic motors in the seats to provide a massage, activating the HVAC system, heating up the seats and/or the steering wheel, etc., but would generally aim to disable the visual components of sanctuary mode 240 while the vehicle is being driven.

The sanctuary mode 240 can be grouped into at least three categories, including curated experiences 242, mindfulness experiences 244, and custom experiences (not illustrated), which is sometimes referred to as "my experience". Curated experiences 242 are sanctuary routines that come pre-programmed with the vehicle. Mindfulness experiences 244 may be associated with meditative routines and can be pre-programmed by the vehicle manufacturer or generated by third parties for installation. Custom experiences allow the end user to build their own sanctuary mode experience, which may be created through directly interfacing with the display(s) 233*a*-233*b* or with a mobile application installed on a smartphone of the end user. For example, a custom experience may involve the user selecting certain music, temperatures, airflows, seat positions, etc., such that the end user is able to synchronize the in-car hardware to provide a custom routine.

Other features associated with the sanctuary mode 240 include on-stage 246 and occasions 248. On-stage 246 provides a karaoke experience within the vehicle. For example, the display(s) 233*a*-233*b* may present the lyrics of a song in a synchronized manner with the ambient lighting in the cabin reacting to the beat, melody, tone, and/or words of the song. Occasions 248 recognizes special occasions based on user data and/or publicly available data. For example, the displays 233*a*-233*b* may be used to provide synchronized "Happy New Year" or "Happy Birthday" routines, based on whatever the occasion is that day. Thus, sanctuary mode 240 is a fully immersive, multi-sensory experience that leverages and synchronizes different hardware components of the vehicle. Sanctuary mode 240 may be activated based on a one-touch interaction and can provide curated experiences both inside and outside the vehicle.

Figure 3:
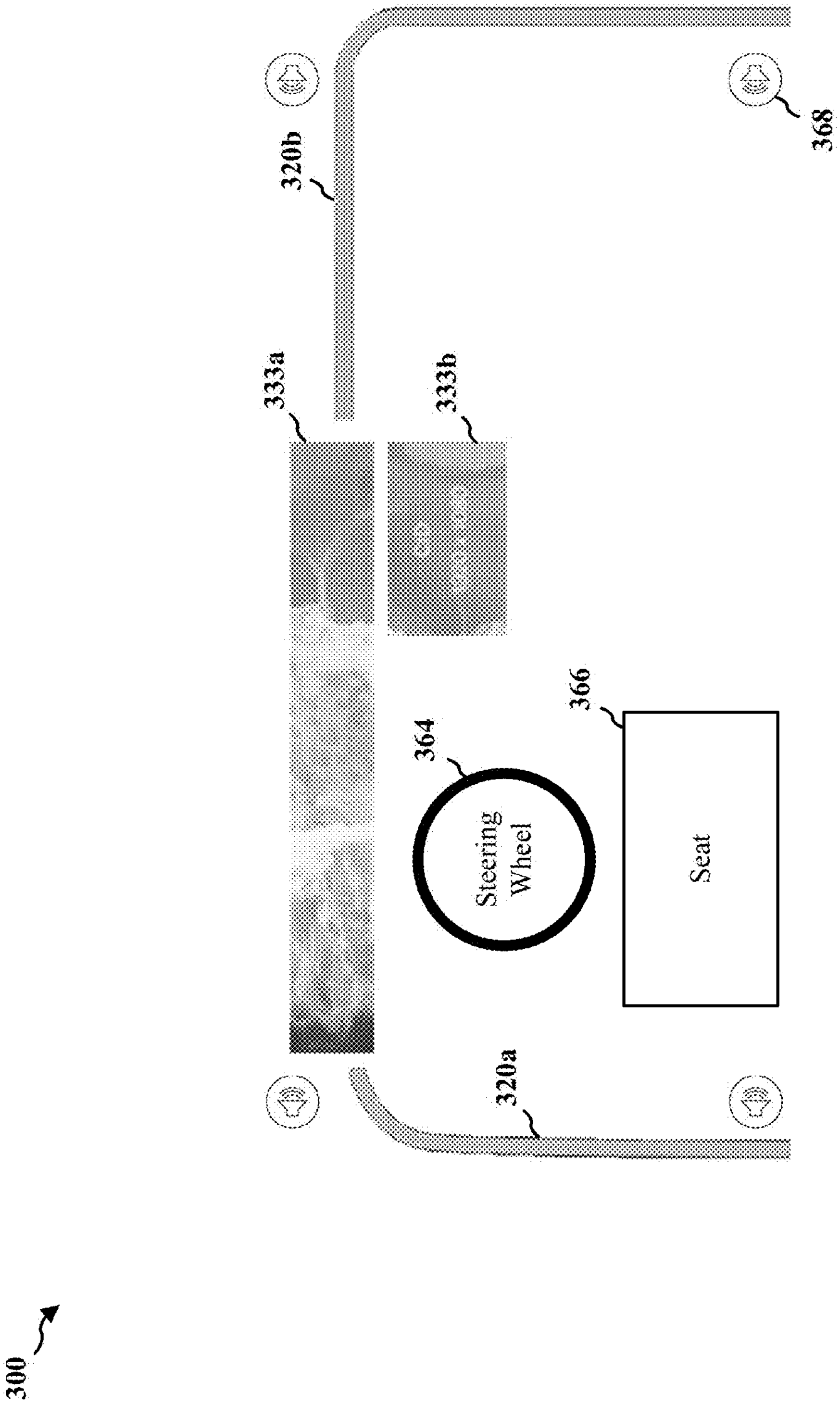
FIG. 3 is a diagram illustrating hardware components of the automobile.

FIG. 3 is a diagram 300 illustrating hardware components of an automobile. The hardware components/systems may be synchronized, as opposed to the end user independently adjusting each component. Different hardware components that can be leveraged for synchronization include the displays(s) (e.g., cockpit panel 333*a* and central information display (CID) 333*b*), left-side LED lights 320*a*, right-side LED lights 320*b*, the steering wheel 364, the seat(s) 366, the audio system 368 (e.g., surround sound), and the HVAC system (not shown).

In an example, the displays 333*a*-333*b* may depict a beach with ocean waves, where the scene extends across both displays 333*a*-333*b*. The audio system 368 (e.g., surround sound) allows the sound of the waves to travel from left to right as the waves roll in across the displays 333*a*-333*b*. The ambient light from the LED lights 320*a*-320*b* may travel in the same direction and/or match/compliment the colors presented on the displays 333*a*-333*b*. Haptic motors located in the seat 366 may provide vibrations that mimic the oceans waves crashing ashore. The HVAC system may disburse cool air into the cabin that aligns with the scene. By synchronizing the hardware components of the vehicle, the system can leverage soundscapes, multiple screens interacting together, meditation experiences, and the like.

Synchronization of all the hardware components may require control units that can interpret each of the different domains. For example, if a racing game is being played in the vehicle, the control unit may have to synchronize the vibrations generated by the haptic motor in the seat 366 with airflows of the HVAC system in real time based on the gaming content. As the gaming content changes, the hardware components may have to behave differently. If certain synchronizations impact other normal functionalities of the vehicle, the system may have to determine which functionality will override the other.

Some experiences, such as sanctuary mode, may be based on a user profile. The user profile may be transferrable from one vehicle to another in order to accommodate the user in different vehicles. For example, a different vehicle may detect that the user is present in the different vehicle and ask the user for permission (e.g., via a mobile application) to access the profile of the user. In further examples, an artificial intelligence/machine learning (AI/ML) model may be implemented to predict and/or generate experiences that may be desirable to the user (e.g., based on the user profile and/or user indicated preferences).

Figure 4:
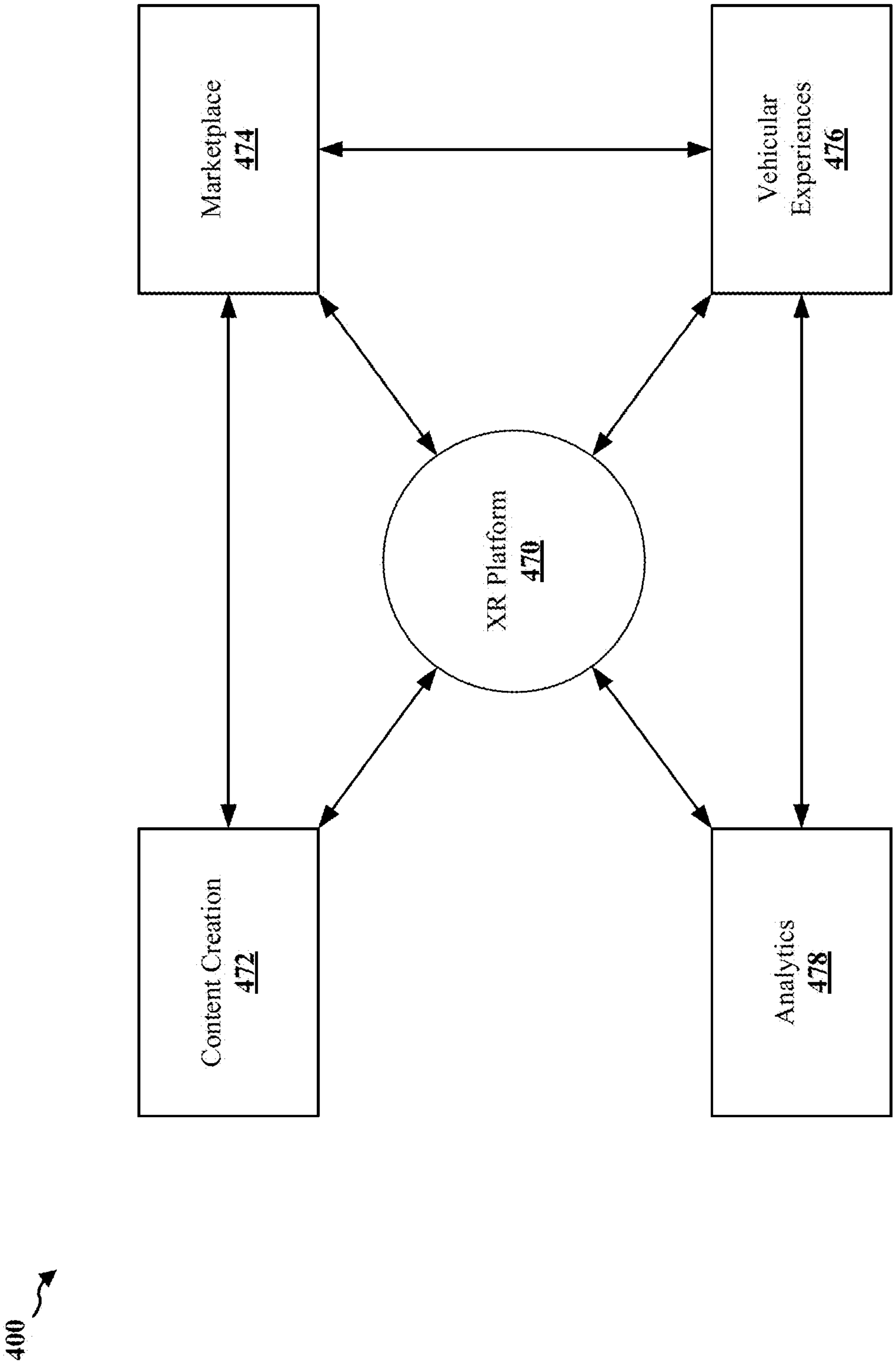
FIG. 4 illustrates a diagram of an immersive content framework.

FIG. 4 illustrates a framework 400 of an immersive content framework. The immersive content framework includes an extended reality (XR) platform 470 in communication/associated with four framework categories: content creation 472, marketplace 474, vehicular experiences 476, and analytics 478. As illustrated in the framework 400, some of the framework categories 472-478 are also in communication/associated with each other.

The content creation category 472 in the framework 400 may include, but is not limited to: a creator platform, content management tool, documentation/requirements (i.e., language/region, versioning, etc.), administrative account management, media cloud storage, media upload/download tool, creator account management, metadata and asset packaging, rights management, media data for creator, application package kit (APK), application program interfaces (APIs), elements and plugins for creator tools, and/or test environment/simulator. In some examples, the content management tool for the content creation 472 is in communication with a marketplace management tool of the marketplace 474.

The marketplace category 474 in the framework 400 may include, but is not limited to: a marketplace, marketplace management tool, user cloud account, purchase/subscription tracking, point of sale (POS), search and discovery, data and reporting, administrative account, over-the-air (OTA)/push updates, promote/demote content, marketplace design and interaction, new content sandbox, and/or third party ad network. In some examples, the marketplace management tool for the marketplace 474 is in communication with a local storage for the vehicular experiences 476. In some examples, the third party ad network for the marketplace 474 is in communication with preferences for the vehicular experiences 476. In some examples, the user cloud account for the marketplace 474 is in communication with a vehicle/user profile for the vehicular experiences 476.

The vehicular experiences category 476 in the framework 400 may include, but is not limited to: an experience, mobility platform, bring your own device (BYOD), virtual reality (VR) head mounted display (HMD), augmented reality (AR)/mixed reality (MR) HMD, vehicle/user profile, preferences, local storage, APK, vehicle controls, audio, speakers, zones, object-based audio (OBA), haptics, virbo-tactile, suspension, in-seat rotators, HVAC, filter, ionizer, lighting, ambient lights, dimming, electrochromic roof, scent diffuser, imaging, screens, high dynamic range (HDR), projection, AR, MR, sensors, air quality, cameras, light meters, in-cabin monitoring system, infrared (IR), motion, accelerometers, global positioning system (GPS), gyroscopes, gesture, microphones, cross-talk cancelation, occupancy detection, speech identifier (ID), and/or voice ID. In some examples, the mobility platform for the vehicular experiences 476 is in communication with an engagement and personalization hub for the analytics 478.

The analytics category 478 in the framework 400 may include, but is not limited to: analytics, engagement and personalization hub, machine learning (ML), prediction, perception, personalization, mood, activity, behavior, device, users, content, key performance indicators (KPIs), interactions, usage, retention, engagement, transactions/purchase intent, and/or affinity. It should be appreciated that while the features of the framework categories 472-478 have been described above as being associated with specific categories 472, 474, 476, 478 for exemplary purposes, in other examples the same or different features may be associated with the same or different framework categories 472-478 or other framework categories not shown in the framework 400.

Several aspects associated with sanctuary mode fit within the vehicular experiences category 476 of the framework 400. For example, the XR platform 470, may communicate with vehicle controls in order to activate vehicle systems, such as haptics. The haptics may then further communicate with virbo-tactile, in-seat rotors, etc., but since haptics is also related to touch the haptics may additionally communicate with the HVAC system, for example. By linking all the features together an interconnected immersive content framework may be generated for use with sanctuary mode.

Figure 5:
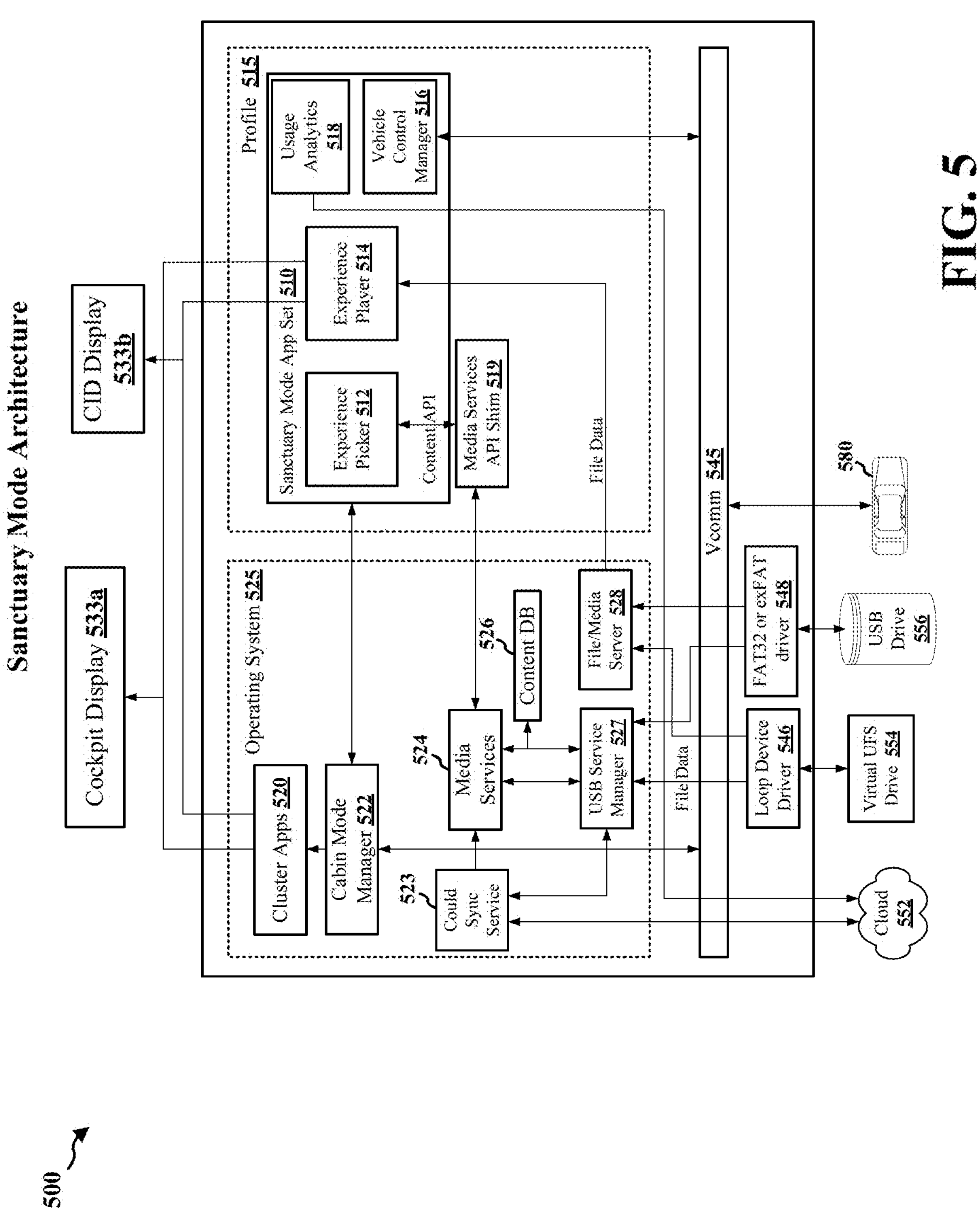
FIG. 5 illustrates a diagram of a sanctuary mode architecture.

FIG. 5 illustrates a diagram 500 of a sanctuary mode architecture. The content used for sanctuary mode may be modular, such that the content can be presented on the display(s) 533*a*-533*b* (i.e., cockpit display 533*a* and/or CID display 533*b*) regardless of a drive state or type of vehicle controls that are included in the automobile 580. The user may also input user preferences via the display(s) 533*a*-533*b* that manipulate the content as well. The automobile 580 adapts the content to the user based on the media and the user preferences/profile 515.

Some sanctuary mode experiences may include video/media experiences, where content elements may continue to be execute even when the vehicle changes from a parked state to a drive state to ensure that the flow of content is continuous. However, for safety purposes, the video may be discontinued on the display(s) 533*a*-533*b* or dynamic ambient lighting may change, while still continuing to implement other content elements, such as the audio, haptics, and HVAC. When transitioning from the drive state to the parked state, sanctuary mode may revert back to the full experience with all content and hardware being available/enabled. In this manner, the automobile 580 adapts to real-time conditions of the user and the vehicle.

The content can range from one video to multiple videos, such as with synchronized audio elements, so that the content is associated with a stream of physical dimensions. Further example dimensions may include the ambient lighting, haptics, the seat moving to a different position, and any other complimentary features of the automobile 580 that may be leveraged for the user experience. In some examples, certain events may cause a seat heater to be activated and deactivated to synchronize with the content.

Sanctuary mode is also configured to dynamically determine conditions of the vehicle for adapting the user experience based on the conditions of the vehicle. For example, in some embodiments, if the vehicle is traveling faster than 17 miles per hour, sanctuary mode may determine to deactivate the video based on that particular condition, but continue to execute other elements associated with the content that is being executed. In some other embodiment, if the vehicle is any gear other than park, sanctuary mode determines to deactivate the video.

Other dynamic determinations include yielding/de-prioritizing sanctuary mode operations to user commands. For example, if the user is cold because the air conditioning is activated as part of the sanctuary mode experience, and the user attempts to activate the heater during that part of the experience, the system is able to determine that even though activation of the air conditioner is part of the programmed routine for the experience, activation of the air conditioning should yield to the user command of switching on the heater instead. In further examples, the system may determine that a seat cooler should also be deactivated based on the user command to activate the heater. Accordingly, a sanctuary mode application set 510 is able to manipulate content instructions provided by a content creator of the user experience. For instance, the system can identify a time code that an event (e.g., air conditioner activation) is supposed to occur during user experience, and bypass such instructions based on a prioritized/overriding command from the user (e.g., heater activation).

Content creators may not know certain conditions of the vehicle at the time they are creating the content. For example, the content may include instructions to drop the interior temperature of the vehicle cabin by 10 degrees to match certain video content being displayed on the vehicular display panel(s) 533*a*-533*b*. However, if the passengers of the vehicle are located in a snowstorm in real life, dropping the cabin temperature by 10 degrees to match the video content may be an uncomfortable change for the passengers. Thus, sanctuary mode may implement dynamic adaption of vehicle systems to prioritize user commands/preferences over coded instructions associated with execution of the content.

The sanctuary mode application set 510 includes an experience picker 512, an experience player 514, usage analytics 518, and a vehicle control manager 516. Dynamic adaptation of the vehicle systems is performed using the vehicle control manager 516. The vehicle control manager 516 may receive instructions, such as from an operating system 525 or a vehicle communications (Vcomm) module 545, associated with execution of the content. The instructions may correspond to a programming language/code used by the content creator to form the content. The vehicle control manager 516 is able to read the instruction and manipulate the instructions, as needed, to prioritize user commands/preferences. In some examples, there may be multiple inputs that the control manager 516 has to dynamically adapt to during presentation of the sanctuary mode experience. Dynamic adaptions by the vehicle control manager 516 is more than just synchronizing different vehicle systems so that system activation/deactivation matches the presented content, but recognizing in real time how to yield or partially yield certain vehicle systems in relation to the content based on user commands/preferences while the user content experience is being executed.

The occupants of the vehicle are always in control of the vehicle systems. As the systems are being manipulated, e.g., activating the fans or triggering the haptics, to provide a fourth dimensional experience with the video, the system is continuously monitoring the same hardware that the system is manipulating for the sanctuary mode experience. If an input is received that indicates a departure from the controls associated with the content experience, the system will be able to detect and implement instructions associated with received input. In other words, once the occupants adjust a vehicle system, the vehicle control manager 516 recognizes that adjustment and prioritizes it over instructions associated with the content.

If the occupants of the vehicle do not adjust any vehicle systems during the sanctuary mode experience, the sanctuary mode application set 510 may return the settings of each system to the original state that the systems were in when the content experience was launched. However, if an occupant changes a setting during execution of the content experience (e.g., deactivating seat vibration during the content experience) the sanctuary mode application set 510 may not return the seat vibration to its original setting given that the occupant switched it off, despite the switch to the system setting occurring after the launch of the content. Accordingly, the sanctuary mode application set 510 continuously monitors for changes initiated by the vehicle occupants. For example, changes to the HVAC system may include temperature changes, adjusting the airflow from a specific vent, the fan speed, etc., which may require monitoring for multiple signals associated with a single vehicular system, such as the HVAC system.

Sanctuary mode aims to provide a pleasant experience while still allowing the user to remain in control of the cabin environment. For example, if the cabin is 70 degrees, but a desert scene in a content experience indicates that the temperature should be 85 degrees, rather than blasting the heater, the system may increase the temperature in incremental steps/deltas, so that the cabin can be heated up to match the content while still being pleasant to the user. That is, the system has to recognize the real time temperature of the cabin and make decisions on temperature adjustments that align with the content but are also expected to be comfortable to the user.

Even though the executed content instructions may indicate a target setting for the vehicle systems (e.g., temperature, haptics, intensity, waveform, etc.), transitioning to such settings in increments/deltas may be based on real time detection of cabin conditions. For example, the system may determine to increase the setting in 3 steps, 4 steps, 5 steps, etc., based on detection of cabin conditions. In other cases, the instructions associated with the content may be to increase the cabin temperature by 20 degrees, but if the cabin temperature is detected to already be at 75 degrees, the system may determine to implement a smaller temperature increase to maintain comfortability of the vehicle occupants rather than increasing the cabin temperature by the full 20 degrees. In some examples, the settings are associated with ceilings and floors to disallow a system from activating outside a certain range. The closer that a condition gets to a particular boundary may trigger more regulated control of the associated vehicle system.

Sanctuary mode may be implemented via the entire instrument cluster and central display(s) 533*a*-533*b* of the vehicle. For example, an application executed for sanctuary mode may include the experience picker 512 (e.g., for selection of the content/experience), the experience player 514 (e.g., for synchronization of multiple displays, audio content, controls, etc.), usage analytics 518, and the vehicle control manager 516, which may identify time codes in the content instructions to control the vehicle systems. A media services API shim 519 is located between the media services 524 and the experience picker 512, and provides content API to the experience picker 512.

An operations engine is used to identify the actions that should be taken with respect to the vehicle systems in association with the content being presented. A script associated with the content may be packaged in the cloud 552 and transcoded to determine video sizes, formats, audio, etc. A cloud synchronization service 523 synchronizes the content experience from the cloud 552 with the vehicle control manager 516, e.g., through the media services module 524.

In other examples, the media services module 524 relays information from a content database 526 and/or a universal serial bus (USB) service manager 527 to the vehicle control manager 516. The media services module 524 monitors execution of the content and may store information in a database (e.g., the content database 526, a virtual universal flash storage (UFS) drive 554, or USB drive 556), so that the information can be quickly retrieved by the media services module 524. For example, the system may be instructed to present 'all the meditational content' or present 'content options for use while driving'. File data retrieved from the virtual UFS drive 554 may be relayed through a loop device driver 546, whereas file data retrieved from the USB drive 556 may be relayed through a file allocation table (FAT)32 or ex-FAT driver 548. In further examples, a file/media server 528 relays the file data from the FAT32 or ex-FAT driver 548 to the experience player 514.

A cabin mode manager 522 may serve as a controller of the sanctuary mode application set 510. For example, the cabin mode manager 522 may indicate that the vehicle is in park to allow unrestricted use of the vehicle systems. The indication from the cabin mode manager 522 is received by an application cluster 520, which can control activation of the vehicle displays 533*a*-533*b* during driving. The cluster 520 can allow the sanctuary mode application set 510 to take over the systems based on the indication/signal received from the cabin mode manager 522. In further examples, if the break pedal is pressed, which may be an indicator of vehicle ignition, the cabin mode manager 522 may reactivate the cluster 520 to prevent further video content from being presented on the vehicle display(s) 533*a*-533*b*. However, the sanctuary mode application set 510 may continue, for example, to play audio or activate haptics in an uninterrupted manner.

Vehicle information separate from sanctuary mode may be layered with the sanctuary mode content while the content is being played. For example, if the battery charge falls below a threshold, the content may be paused/stopped, or a low battery warning may be presented over top of the content. Likewise, if an incoming call is being received, the content may be paused/stopped, or a widget may appear over top of the content being presented. Thus, the vehicle information is being managed alongside the executed content to facilitate underlying vehicular features.

The experience player 514 may receive time codes for system activations associated with the content in order to synchronize the vehicle systems with the content. Thus, the experience player 514 may ensure that different time codes, such as audio time codes and video time codes, match each other for synchronization of the audio and video systems. The experience player 514 may provide a master time clock to the vehicle control manager 516, so that the vehicle control manager 516 can be in sync with the video content. If the video were to be rewound, then the vehicle control manager 516 will also rewind the master clock for matching the system settings to their previous states based on the time codes. Thus, video content may be looped, associated with set timers, as well as manipulated via operations such as play, pause, restart, and scrubbing.

The vehicle control manager 516 can determine operations for particular time codes before the video even starts playing. The vehicle control manager 516 may receive extensible markup language (XML) or a JavaScript Object notation (JSON), parse the information, and determine an operation to perform for individual time codes. In some examples, the system converts received XML code to a JSON script and verifies that the script is usable based on the time codes of the content. The experience player 514 provides the clock that triggers a reaction to the time codes. That is, the experience player 514 allows a sequence of operations to be performed in synchronization. An analytics manager can capture data usage analytics 518, such as a behavior of the user, types of content the user plays, how long the content is being playing, etc. User history is stored in a database for future reference by the experience player 514. For example, certain content may be re-executed based on environmental conditions being similar to historical data/usage analytics 518 stored for the user.

Figure 6:
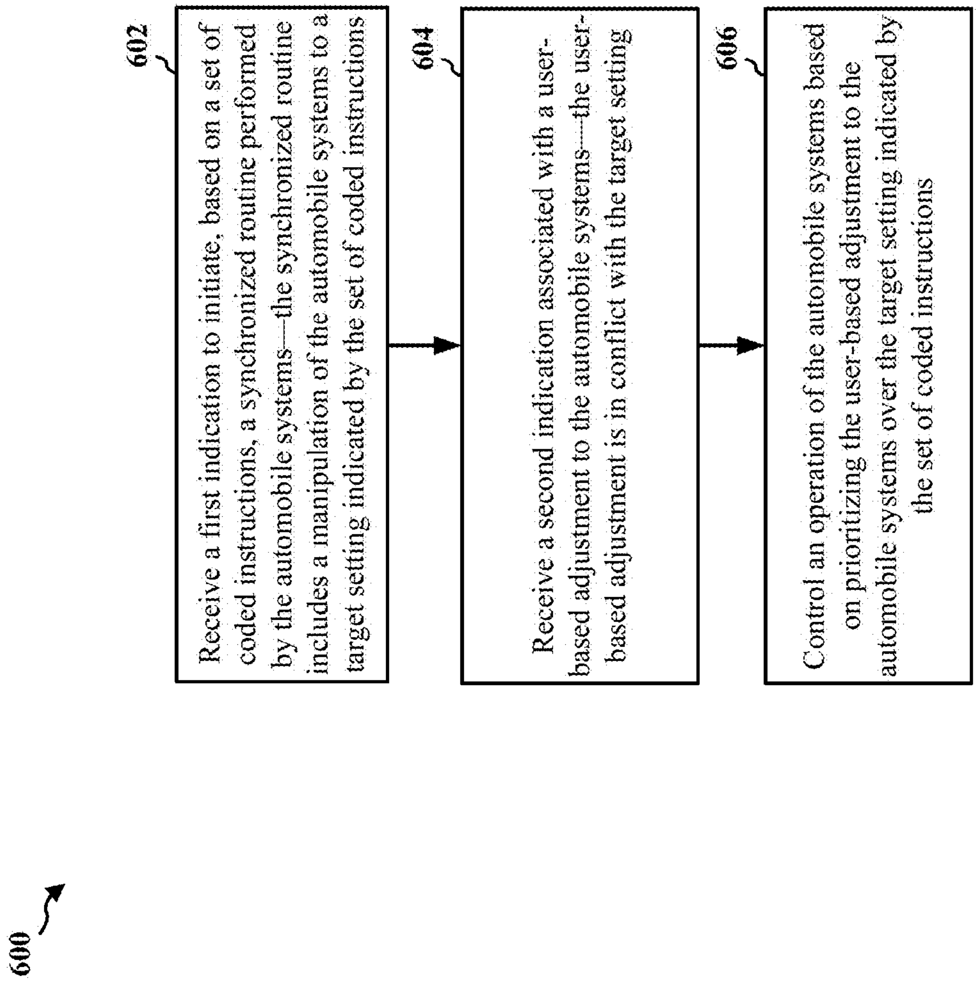
FIG. 6 is a flowchart of a method of controlling synchronized operations of automobile systems.

FIG. 6 is a flowchart 600 of a method of performing synchronized operations of different types of automobile systems. The method may be performed by processing logic that may comprise hardware (e.g., circuitry, dedicated logic, programmable logic, a processor, a processing device, a CPU, a system-on-chip, etc.), software (e.g., instructions running/executing on a processing device), firmware (e.g., microcode), or a combination thereof. In some embodiments, at least a portion of the method may be performed based on aspects of FIGS. 1-5.

With reference to FIG. 6, the method illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in the method may be performed in an order different than presented, and that not all of the blocks in the method may be performed.

The method begins at block 602, where processing logic receives a first indication to initiate, based on a set of coded instructions, a synchronized routine performed by the automobile systems—the synchronized routine includes a manipulation of the automobile systems to a target setting indicated by the set of coded instructions.

At block 604, the processing logic receives a second indication associated with a user-based adjustment to the automobile systems—the user-based adjustment is in conflict with the target setting.

At block 606, the processing logic controls an operation of the automobile systems based on prioritizing the user-based adjustment to the automobile systems over the target setting indicated by the set of coded instructions.

Figure 7:
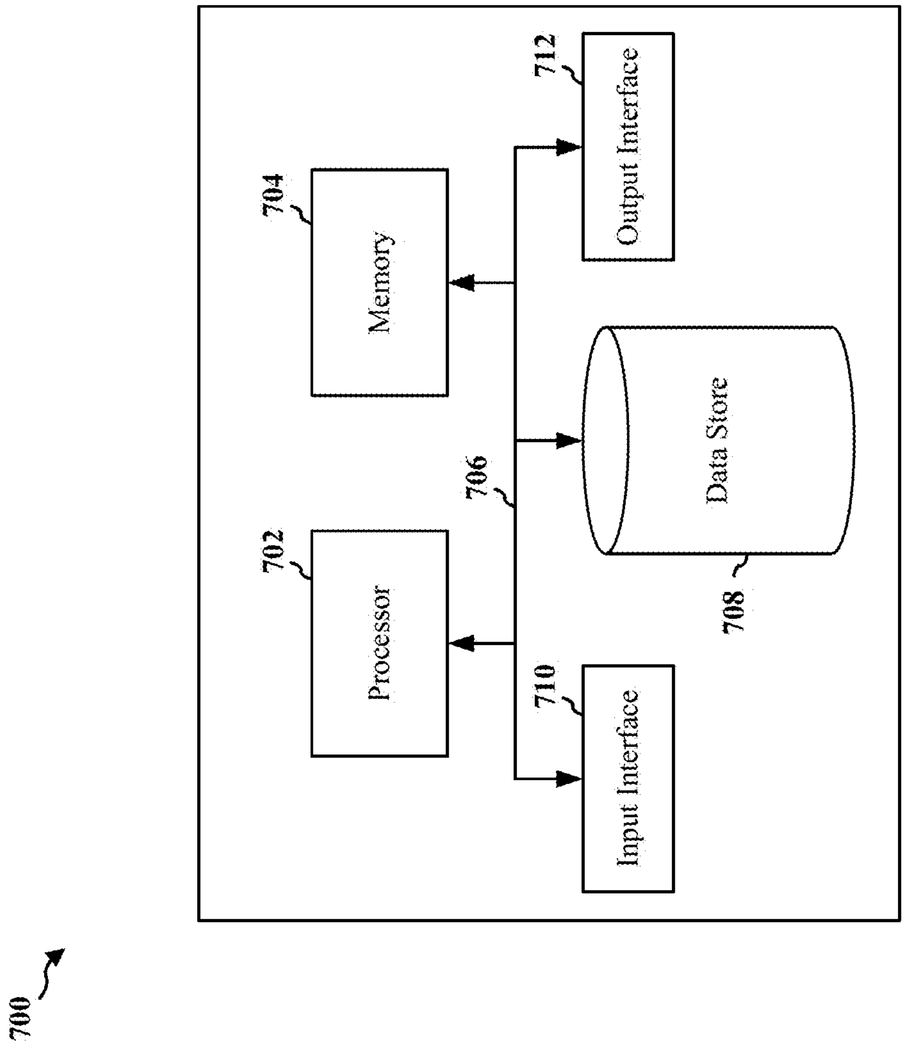
FIG. 7 is a high-level illustration of an exemplary computing device that can be used in accordance with the systems and methodologies disclosed herein.

FIG. 7 is a high-level illustration of an exemplary computing device 700 that can be used in accordance with the systems and methodologies disclosed herein. For instance, the computing device 700 may be or include the device 104. The computing device 700 includes at least one processor 702 that executes instructions that are stored in a memory 704. The instructions may be, for instance, instructions for implementing functionality described as being carried out by one or more modules or instructions for implementing one or more of the methods described above. The processor 702 may access the memory 704 by way of a system bus 706.

The computing device 700 additionally includes a data store 708 that is accessible by the processor 702 by way of the system bus 706. The data store 708 may include executable instructions and the like. The computing device 700 also includes an input interface 710 that allows external devices to communicate with the computing device 700. For instance, the input interface 710 may be used to receive instructions from an external computing device, from a user, etc. The computing device 700 also includes an output interface 712 that interfaces the computing device 700 with one or more external devices.

Additionally, while illustrated as a single system, it is to be understood that the computing device 700 may be a distributed system. Thus, for instance, several devices may be in communication by way of a network connection and may collectively perform tasks described as being performed by the computing device 700.

The description herein is provided to enable a person skilled in the art to practice the various aspects described herein. Various modifications to these aspects will be readily apparent to those skilled in the art, and the generic principles defined herein may be applied to other aspects. Thus, the claims are not limited to the aspects described herein but are to be interpreted in view of the full scope of the present disclosure consistent with the language of the claims.

Reference to an element in the singular does not mean "one and only one" unless specifically stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. Unless specifically stated otherwise, the term "some" refers to one or more. Combinations such as "at least one of A, B, or C" or "one or more of A, B, or C" include any combination of A, B, and/or C, such as A and B, A and C, B and C, or A and B and C, and may include multiples of A, multiples of B, and/or multiples of C, or may include A only, B only, or C only. Sets should be interpreted as a set of elements where the elements number one or more.

Unless otherwise specifically indicated, ordinal terms such as "first" and "second" do not necessarily imply an order in time, sequence, numerical value, etc., but are used to distinguish between different instances of a term or phrase that follows each ordinal term.

Structural and functional equivalents to elements of the various aspects described throughout this disclosure that are known or later come to be known to those of ordinary skill in the art are expressly incorporated herein by reference and are encompassed by the claims. The words "module," "mechanism," "element," "device," and the like may not be a substitute for the word "means." As such, no claim element is to be construed as a means plus function unless the element is expressly recited using the phrase "means for." As used herein, the phrase "based on" shall not be construed as a reference to a closed set of information, one or more conditions, one or more factors, or the like. In other words, the phrase "based on A", where "A" may be information, a condition, a factor, or the like, shall be construed as "based at least on A" unless specifically recited differently.

The following aspects are illustrative only and may be combined with other aspects or teachings described herein, without limitation.

Example 1 is a method of controlling synchronized operations of automobile systems, including: receiving a first indication to initiate, based on a set of coded instructions, a synchronized routine performed by the automobile systems, the synchronized routine including a manipulation of the automobile systems to a target setting indicated by the set of coded instructions; receiving a second indication associated with a user-based adjustment to the automobile systems, the user-based adjustment being in conflict with the target setting; and controlling an operation of the automobile systems based on prioritizing the user-based adjustment to the automobile systems over the target setting indicated by the set of coded instructions.

Example 2 may be combined with Example 1 and includes that the prioritizing the user-based adjustment over the target setting, further includes: transitioning the operation of the automobile systems towards the target setting in one or more increments over time.

Example 3 may be combined with any of Examples 1-2 and includes that the one or more increments are associated with an operational range that prevents the transitioning of the automobile systems from being incremented outside the operational range.

Example 4 may be combined with any of Examples 1-3 and includes that the user-based adjustment to the automobile systems is based on at least one of: real-time user control of the automobile systems, historical user control of the automobile systems, a user profile, a user preference, detection of a current cabin condition of an automobile including the automobile systems, or a mobility state of the automobile.

Example 5 may be combined with any of Examples 1-4 and includes that the set of coded instructions includes time codes for the automobile systems to perform the synchronized routine, the time codes being an indicator of a time at which the manipulation of the automobile systems conflicts with the user-based adjustment to the automobile systems.

Example 6 may be combined with any of Examples 1-5 and further includes monitoring for the second indication associated with the user-based adjustment to the automobile systems during an execution of the set of coded instructions initiated based on the first indication.

Example 7 may be combined with any of Examples 1-6 and further includes adjusting, after a completion of the synchronized routine, the automobile systems to at least one of: a first setting of the automobile systems at a launch of the synchronized routine, or a second setting of the automobile systems indicated during execution of the synchronized routine and corresponding to the user-based adjustment.

Example 8 may be combined with any of Examples 1-7 and includes that the manipulation of the automobile systems during a re-execution of the synchronized routine is adjusted based on a current cabin condition being within a threshold range of historical data associated with a prior execution of the synchronized routine.

Example 9 may be combined with any of Examples 1-8 and includes that vehicle indictors conveying information that is separate from implementation of the synchronized routine is layered with the set of coded instructions.

Example 10 may be combined with any of Examples 1-9 and includes that the synchronized routine is performed using a vehicle control manager that controls the operation of the automobile systems.

Example 11 may be combined with any of Examples 1-10 and includes that the automobile systems include at least one of: a display panel, a lighting system, an audio system, an HVAC system, a haptic motor, a seat positing system, a seat heater, a seat cooler, a scent dispenser, or a steering wheel element.

Example 12 may be combined with any of Examples 1-11 and includes that the set of coded instructions corresponds to at least one of: pre-programmed instructions, customizable instructions, or instructions generated by an AI/ML model.

Example 13 may be combined with any of Examples 1-12 and further includes determining whether to override an activation of the automobile systems when the activation interferes with an ordinary operation of an automobile that includes the automobile systems.

Example 14 is an apparatus for implementing a method as in any of Examples 1-13.

Example 15 is an apparatus including means for implementing a method as in any of Examples 1-13.

Example 16 is a non-transitory computer-readable medium storing computer executable code, the code when executed by at least one processor causes the at least one processor to implement a method as in any of Examples 1-13.

What is claimed is:

1. A method of controlling synchronized operations of automobile systems, comprising:

receiving a first indication to initiate, based on a set of coded instructions, a synchronized routine performed by the automobile systems, the synchronized routine including a manipulation of the automobile systems to a target setting indicated by the set of coded instructions;

receiving a second indication associated with a user-based adjustment to the automobile systems, the user-based adjustment being in conflict with the target setting;

identifying time codes in the set of coded instructions, the time codes indicating a time within the synchronized routine for the automobile systems to perform aspects of the synchronized routine; and controlling an operation of the automobile systems during the synchronized routine based on prioritizing, at the time indicated by the time codes, the user-based adjustment to the automobile systems over the target setting.

2. The method of claim 1, wherein the prioritizing the user-based adjustment over the target setting, further comprises:

transitioning the operation of the automobile systems towards the target setting in one or more increments over time.

3. The method of claim 2, wherein the one or more increments are associated with an operational range that prevents the transitioning of the automobile systems from being incremented outside the operational range.

4. The method of claim 1, wherein the user-based adjustment to the automobile systems is based on at least one of:

real-time user control of the automobile systems, historical user control of the automobile systems, a user profile, a user preference, detection of a current cabin condition of an automobile including the automobile systems, or a mobility state of the automobile.

5. The method of claim 1, wherein the time codes further indicate a time at which the manipulation of the automobile systems conflicts with the user-based adjustment to the automobile systems.

6. The method of claim 1, further comprising:

monitoring for the second indication associated with the user-based adjustment to the automobile systems during an execution of the set of coded instructions initiated based on the first indication.

7. The method of claim 1, further comprising:

adjusting, after a completion of the synchronized routine, the automobile systems to at least one of:

a first setting of the automobile systems at a launch of the synchronized routine, or a second setting of the automobile systems indicated during execution of the synchronized routine and corresponding to the user-based adjustment.

8. The method of claim 1, wherein the manipulation of the automobile systems during a re-execution of the synchronized routine is adjusted based on a current cabin condition being within a threshold range of historical data associated with a prior execution of the synchronized routine.

9. The method of claim 1, wherein vehicle indicators conveying information that is separate from implementation of the synchronized routine is layered with the set of coded instructions.

10. The method of claim 1, wherein the synchronized routine is performed using a vehicle control manager that controls the operation of the automobile systems.

11. The method of claim 1, wherein the automobile systems include at least one of: a display panel, a lighting system, an audio system, a heat ventilating and air conditioning (HVAC) system, a haptic motor, a seat positing system, a seat heater, a seat cooler, a scent dispenser, or a steering wheel element.

12. The method of claim 1, wherein the set of coded instructions corresponds to at least one of: pre-programmed instructions, customizable instructions, or instructions generated by an artificial intelligence/machine learning (AI/ML) model.

13. The method of claim 1, further comprising:

determining whether to override an activation of the automobile systems when the activation interferes with an ordinary operation of an automobile that includes the automobile systems.

14. An apparatus for controlling synchronized operations of automobile systems, comprising:

a memory; and at least one processor coupled to the memory and configured to:

receive a first indication to initiate, based on a set of coded instructions, a synchronized routine performed by the automobile systems, the synchronized routine including a manipulation of the automobile systems to a target setting indicated by the set of coded instructions;

receive a second indication associated with a user-based adjustment to the automobile systems, the user-based adjustment being in conflict with the target setting;

identify time codes in the set of coded instructions, the time codes indicating a time within the synchronized routine for the automobile systems to perform aspects of the synchronized routine; and control an operation of the automobile systems during the synchronized routine based on prioritization, at the time indicated by the time codes, of the user-based adjustment to the automobile systems over the target setting.

15. The apparatus of claim 14, wherein to prioritize the user-based adjustment over the target setting, the at least one processor is further configured to:

transition the operation of the automobile systems towards the target setting in one or more increments over time.

16. The apparatus of claim 14, wherein the user-based adjustment to the automobile systems is based on at least one of:

real-time user control of the automobile systems, historical user control of the automobile systems, a user profile, a user preference, detection of a current cabin condition of an automobile including the automobile systems, or a mobility state of the automobile.

17. The apparatus of claim 14, wherein the time codes further indicate a time at which the manipulation of the automobile systems conflicts with the user-based adjustment to the automobile systems.

18. The apparatus of claim 14, wherein the at least one processor is further configured to:

monitoring for the second indication associated with the user-based adjustment to the automobile systems during an execution of the set of coded instructions initiated based on the first indication.

19. The apparatus of claim 14, wherein the at least one processor is further configured to:

adjust, after a completion of the synchronized routine, the automobile systems to at least one of:

a first setting of the automobile systems at a launch of the synchronized routine, or a second setting of the automobile systems indicated during execution of the synchronized routine and corresponding to the user-based adjustment.

20. A non-transitory computer-readable medium storing computer executable code, the code when executed by at least one processor causes the at least one processor to:

receive a first indication to initiate, based on a set of coded instructions, a synchronized routine performed by automobile systems, the synchronized routine including a manipulation of the automobile systems to a target setting indicated by the set of coded instructions;

receive a second indication associated with a user-based adjustment to the automobile systems, the user-based adjustment being in conflict with the target setting;

identify time codes in the set of coded instructions, the time codes indicating a time within the synchronized routine for the automobile systems to perform aspects of the synchronized routine; and control an operation of the automobile systems during the synchronized routine based on prioritization, at the time indicated by the time codes, of the user-based adjustment to the automobile systems over the target setting.

* * * * *